# 2,934,551

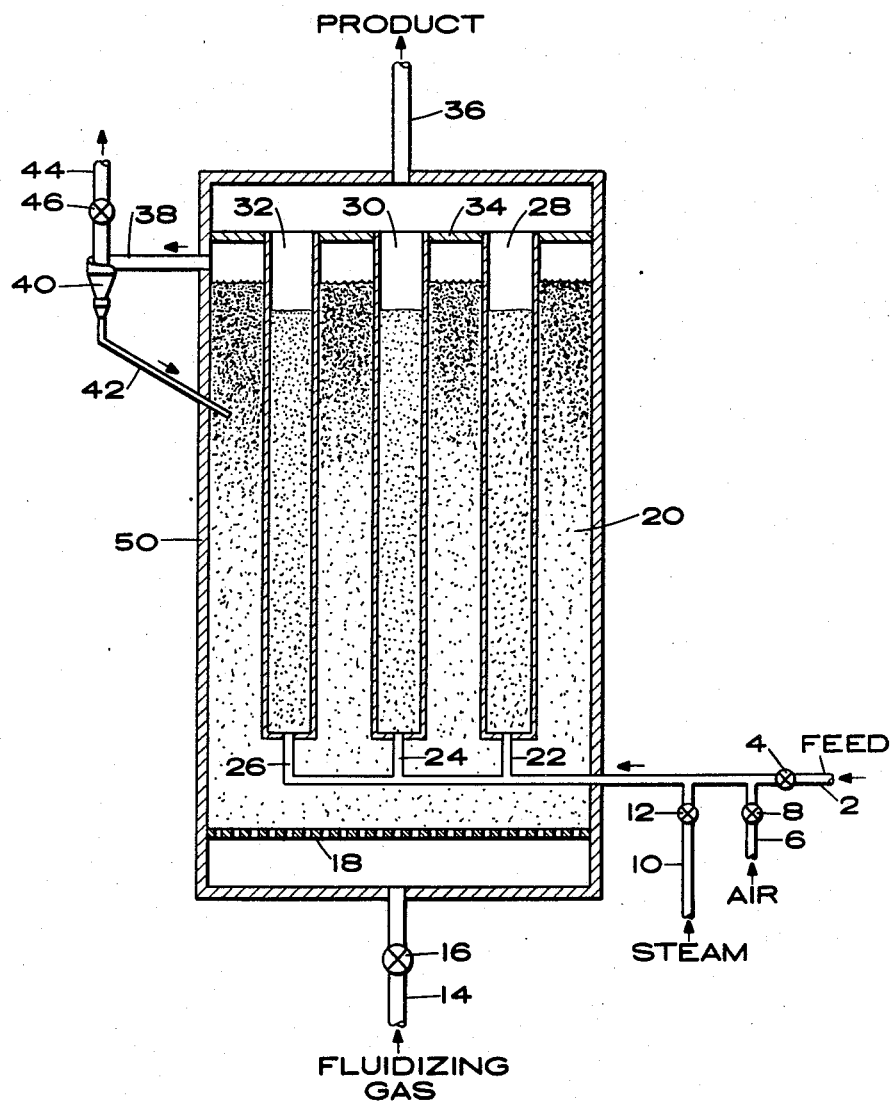
RICHARD F. STRINGER INVENTOR

OXIDATION OF SATURATED HYDROCARBONS USING A CALCIUM NICKEL-PHOSPHATE CATALYST

Richard Franklin Stringer, Baton Rouge, La., assignor to Esso Research and Engineering Company, a corporation of Delaware Application April 30, 1958, Serial No. 732,011

14 Claims. (Cl. 260—451)

This invention relates to catalytic vapor phase partial oxidation of organic compounds heretofore found suitable for noncatalytic vapor phase partial oxidation with fluidized inert solids.

More particularly it relates to an improved process wherein hydrocarbons such as found in light and heavy naphthas are oxidatively dehydrogenated to yield desirable olefins, aromatics and oxygenated compounds.

The term "oxygenated compounds" is used herein to refer to oxygen-containing, hydrocarbon-derived organic compounds of which aldehydes, ketones, alcohols and epoxides are representative.

Still more specifically it relates to an improved process wherein partial oxidation is carried out with air or molecular oxygen in the presence of a calcium-nickel phosphate catalyst.

The use of a calcium-nickel phosphate catalyst for producing diolefins from mono-olefins is well known in the art. The more effective of these catalysts contain about 6 to 12 atoms of calcium per atom of nickel and appear to have a definite spatial relationship between the calcium atoms and the nickel atoms. These catalysts are usually employed in the form of coarse granules or pressed tablets or pellets. Methods for preparing these catalysts are described in U.S. Patents 2,456,367; 2,542,813 and 2,816,081.

It has now been discovered that by adding air or molecular oxygen to a hydrocarbon-containing feed in amounts sufficient to produce an $O_2$/feed ratio of 0.2 to 2.0 and reacting the mixture in the presence of a catalyst as above described at a temperature between 500° and 950° F., a new and different product yield will result characterized by high yields of $C_6$ olefinic and aromatic dehydrogenation products, olefins other than those having 6 carbon atoms and other oxygenated compounds.

The reaction may be carried out at either atmospheric or superatmospheric pressures. Higher pressures tend to increase the yield of gases of lower value at the expense of more useful products. However, this may be desirable under certain circumstances where a variance in product selectivity is desired. The best pressure to use depends on the temperature of reaction, the inherent oxidation rate of the hydrocarbon, and the completeness of the recovery of the volatile products that is desired. The more reactive the hydrocarbon, the lower the pressure.

The reaction of this invention may be carried out in a reactor in which the catalyst is employed either in the form of a fixed, movable or "fluidized" bed. For a better contact of the reactants and a higher rate of feed, the so-called fluidized bed is preferred. In carrying out this invention with a fluidized bed in the reactor the hydrocarbon-containing feed is mixed with oxygen or air, preheated and passed upward in the gas or vapor phase through a confined bed of finely divided catalytic solids at a velocity sufficient to maintain the solids in a state of ebullient motion, commonly called a fluidized state. The product is removed at, or near, the top of the reactor. Feed that is not converted may be separated from the oxidation products and recycled to the reaction bed. When a fluidized catalytic bed is employed, a feed rate of 0.1 to 0.4, preferably 0.15 to 0.25, feed volume/reactor volume/hour based on reactor volume of dense phase fluidized catalyst is suitable for carrying out this invention.

Reactions of this type are highly exothermic and both product yield and selectivity depend upon maintaining the reactor temperature within a predetermined critical temperature range. Various methods and heat exchange mediums have been employed in the past to control exothermic reactions. These methods and mediums include liquid mediums circulated without or within the reaction zone, inert gases or solids intermixed with the reactants, removing a portion of the catalyst from the reaction zone and returning the same after cooling and the use of fluidized solids external to the reaction zone. The scope of this invention is not limited to the use of any particular means of temperature control; however, the use of fluidized solids employed externally to the reaction zone has proven to be a most advantageous method to control, within narrow limits, the temperature range within the reaction zone.

Where a fluidized solid is employed as the heat exchange medium, a reactor is required wherein the zone or zones of reaction are surrounded by an area sufficient to permit a quantitative, free movement of the fluidized solids around each such zone and which in turn is confined within some type of outer shell. The fluidized solids employed comprise finely divided solids intermixed with a small amount of a gaseous agent being regulated to maintain the solid in a mobile, ebullient state. A relatively large body or bath of fluidized material is maintained in intimate heat exchange relationship with the substances undergoing reaction, so that the body of the fluidized material is capable of absorbing or liberating relatively large amounts of heat with relatively little change in temperature. When operating in this manner, the relatively large body or bath of fluidized solid serves as a thermostat or heat reservoir to maintain the reaction temperature within closely confined limits. An apparatus using the above-described heat exchange medium and of the type which may be used for carrying out the instant invention is described in detail in U.S. Patent 2,459,836 beginning at line 65, column 6 and extending to line 3 of column 8.

However, it should be understood that the operations of this invention are not limited to any particular form or type of apparatus. In the accompanying drawing is illustrated a preferred type of apparatus in side elevation view for carrying out this invention and is operated as hereinafter described in detail.

The feedstock to be partially oxidized is introduced through line 2 by means of valve 4 and mixed with oxygen or air admitted through line 6 and valve 8. If desired, steam diluent may also be mixed with the feed through line 10 and valve 12. The mixture of feedstock, oxygen or air and, in some cases, steam is preheated to reaction temperature in line 2 which is surrounded for a portion of its length by the inert heat transfer solids 20 in chamber 50. The heat transfer solids may be sand, quartz or other inert solids of suitable particle size for fluidization. The coolant or heat transfer solids are fluidized by air, water, steam or hydrocarbon stream admitted through line 14 and valve 16. This material passes through gas distributor grid 18 and fluidizes and cools the heat transfer solids 20.

The preheated feedstock, air and/or oxygen and steam passes from line 2 through lines 22, 24 and 26 into reactor tubes 28, 30 and 32 containing calcium-nickel phosphate catalyst. This catalyst is preferably finely divided so that it may be fluidized by the feedstock stream. Fluidization of the catalyst permits rapid transfer of the heat of reaction through the walls of tubes 28, 30 and 32 and thence to the heat transfer solids 20. Products of reaction pass through a header 34 and exit via line 36.

This product is condensed and the unconverted feedstock and/or partially converted products thereof formed in the reaction described may be separated and recycled, if desired.

The air, steam or process stream used in fluidizing and cooling heat transfer solids 20 may be passed through line 38 to cyclone 40, after which it exits through line 44 and valve 46. This stream may then be passed through a heat exchange unit and/or be employed for further processing of the heated feedstock stream.

The invention is useful in the selective catalytic oxidation of various hydrocarbon feed stocks which may boil over a wide temperature range and vary considerably in chemical composition. The essential requirement is that the feed be vaporous at reaction temperatures which will usually be in the range of 500° to 950° F., preferably 700° to 900° F. The invention is particularly effective for selective oxidation of normal or mono-methyl substituted paraffins having about 5 to 16 carbon atoms per molecule and naphthas rich in paraffins or naphthenes. In addition to these the lower (i.e. $C_1$ to $C_4$) paraffins, the corresponding olefins and naphthenes such as cyclohexane, methylcyclopentane, and methylcyclohexane may be used as feedstocks under proper conditions.

If products of a more highly oxidized state are desired, oxygenated products either separately or admixed with a hydrocarbon stream may be employed as the initial feedstock.

More generally speaking, oxidizable organic compounds which are thermally stable for about a second at the temperature of reaction can be treated by the technique of this invention.

The following example will illustrate further the nature of the invention and its advantages in producing valuable compounds from the controlled vapor phase oxidation of a saturated aliphatic hydrocarbon.

EXAMPLE I

In a continuous process, hexane was fed into a thin tube type reactor such as that shown in the drawing, the reactor tube being immersed in a fluidized bed of sand. The reaction was carried out at a temperature of about 880° F. and the $O_2$/hexane mol ratio in the feed was maintained at about 0.9/1. The hexane feed rate based on reactor volume of dense phase fluidized catalyst was maintained at about 0.2 v./v./hr. The resulting products from this reaction were analyzed and the more valuable olefinic, aromatic and oxygenated yields compared with the corresponding results of non-catalytic oxidation with fluidized inert solids at similar operating conditions. The comparative data appears in the following table:

*Table I*

PRODUCT YIELDS FROM PARTIAL OXIDATION OF HEXANE

| Product Yields, Wt. Percent on Hexane Feed | Fluidized Calcium-Nickel Phosphate Catalyst and Oxygen | Fluidized Inert Solids and Oxygen |
|---|---|---|
| Unconverted Hexane | 44.0 | 46.4 |
| Oxygenated Compounds | 27.0 | 23.9 |
| $C_2$ to $C_5$ Olefins | 16.3 | 16.1 |
| Hexenes | 8.5 | 5.8 |
| Benzene | 4.5 | 0.0 |

Thus among the advantages of this process as compared to processes employing non-catalytic inert solids are the increased yields in valuable olefins, particularly $C_6$ olefins, and aromatics. Benzene is not an uncatalyzed oxidation product of hexane even when oxygen is present nor does the calcium-nickel phosphate catalyst without oxygen as described convert hexane to benzene. Thus the reaction of the instant invention results from a novel cooperation between the catalyst and gaseous oxygen as herein recited. Another apparent advantage of the instant process is the high level of conversion attainable per pass i.e. in the range of 50 plus percent whereas other processes for partial oxidation often operate at much lower conversion levels.

What is claimed is:

1. A process for the partial oxidation of substantially saturated organic compounds which comprises reacting said compounds with gaseous oxygen in the presence of a calcium-nickel phosphate catalyst 500 to 950° F.

2. A process according to claim 1 wherein the organic compounds are paraffinic hydrocarbons having from 5 to 16 carbon atoms per molecule.

3. A process according to claim 1 wherein said organic compounds are hydrocarbons and their partially oxygenated derivatives.

4. A process for the oxidation of a hydrocarbon feed rich in saturated compounds which comprises introducing said hydrocarbon feed admixed with gaseous oxygen in a mol ratio of $O_2$/hydrocarbon of 0.2 to 2.0 into a reaction zone wherein a temperature of between 500° and 950° F. is maintained, contacting said hydrocarbon feed in a vaporous state and said gaseous oxygen with a calcium-nickel phosphate catalyst for a time sufficient to allow the conversion of a substantial amount of said hydrocarbon feed and said oxygen to the oxidation reaction products thereof, removing said reaction products from said zone and recovering said reaction products from the unconverted portion of said hydrocarbon feed and said gaseous oxygen.

5. A process according to claim 4 wherein said hydrocarbon feed is rich in saturated aliphatic hydrocarbons.

6. A process according to claim 4 wherein said gaseous oxygen is introduced in the form of air.

7. A process according to claim 4 wherein said hydrocarbon feed is rich in hexane.

8. A process according to claim 4 wherein said hydrocarbon feed is rich in $C_5$ to $C_{16}$ normal paraffins.

9. A process according to claim 4 wherein said hydrocarbon stream is rich in $C_5$ to $C_{16}$ mono-methyl substituted paraffins.

10. A process for producing unsaturated hydrocarbons which comprises introducing a saturated aliphatic hydrocarbon comprising feed admixed with gaseous oxygen in a mol ratio of $O_2$/hydrocarbons of 0.2 to 2.0 into a reaction zone wherein a temperature of between 700 and 900° F. is maintained, contacting said saturated aliphatic hydrocarbon comprising feed in a vaporous state and said oxygen with a calcium-nickel phosphate catalyst, for a time sufficient to allow the conversion of a substantial amount of said saturated aliphatic hydrocarbon comprising feed to said unsaturated hydrocarbons removing the resulting reaction mixture from said reaction zone and recovering said aromatic hydrocarbons from said reaction mixture.

11. A process according to claim 10 wherein the unsaturated hydrocarbon produced is benzene.

12. A process for the oxidation of saturated aliphatic hydrocarbons which comprises mixing said hydrocarbons with gaseous oxygen in the mol ratio of $O_2$/hydrocarbon of 0.2 to 2.0, introducing the resulting mixture in gaseous phase into a thin walled reaction zone wherein a temperature of between 700° and 900° F. is maintained, said reaction zone being maintained in intimate relationship with a heat exchange medium external to said zone, contacting said mixture with a calcium-nickel phosphate catalyst in the form of finely divided solids, passing said mixture upwardly through said solids at a velocity adjusted to maintain said solids in a dense turbulent suspension and to effect a partial oxidation of said hydrocarbons while passing through said suspension, removing the the resulting oxidation products with unreacted portions of said mixture and recovering said oxidation products.

13. A process according to claim 12 in which the saturated aliphatic hydrocarbons are $C_5$ to $C_{16}$ normal paraffins.

14. A process according to claim 12 in which the saturated aliphatic hydrocarbons are $C_5$ to $C_{16}$ mono-methyl substituted paraffins.

References Cited in the file of this patent

UNITED STATES PATENTS

| | | |
|---|---|---|
| 2,456,368 | Britton | Dec. 14, 1948 |
| 2,542,813 | Heath | Feb. 20, 1951 |
| 2,604,479 | Rollman | July 22, 1952 |
| 2,727,810 | Leffler | Dec. 20, 1955 |
| 2,752,407 | Cahn | June 26, 1956 |
| 2,809,981 | Kittleson et al. | Oct. 15, 1957 |